US008671029B2

(12) United States Patent
Kassaei et al.

(10) Patent No.: US 8,671,029 B2
(45) Date of Patent: Mar. 11, 2014

(54) METHOD, MEDIUM, AND SYSTEM FOR MANAGING RECOMMENDATIONS IN AN ONLINE MARKETPLACE

(75) Inventors: Farhang Kassaei, San Jose, CA (US); Jaykumar Patel, San Jose, CA (US)

(73) Assignee: eBay Inc., San Jose, CA (US)

( * ) Notice: Subject to any disclaimer, the term of this patent is extended or adjusted under 35 U.S.C. 154(b) by 199 days.

(21) Appl. No.: 12/949,352

(22) Filed: Nov. 18, 2010

(65) Prior Publication Data
US 2011/0173095 A1 Jul. 14, 2011

Related U.S. Application Data

(60) Provisional application No. 61/293,899, filed on Jan. 11, 2010.

(51) Int. Cl.
*G06Q 30/00* (2012.01)
(52) U.S. Cl.
USPC .................................. 705/26.7; 709/223
(58) Field of Classification Search
USPC .............. 705/319, 26.1, 26.7, 14.49; 709/223
See application file for complete search history.

(56) References Cited

U.S. PATENT DOCUMENTS

| 7,797,413 | B2* | 9/2010 | Adelman et al. ............... 709/223 |
| 7,870,026 | B2* | 1/2011 | Krishnan et al. ............ 705/14.49 |
| 2004/0230511 | A1* | 11/2004 | Kannan et al. .................. 705/35 |
| 2005/0149397 | A1 | 7/2005 | Morgenstern et al. |
| 2006/0282304 | A1* | 12/2006 | Bedard et al. ..................... 705/10 |
| 2007/0043583 | A1* | 2/2007 | Davulcu et al. .................... 705/1 |
| 2007/0121843 | A1* | 5/2007 | Atazky et al. ............ 379/114.13 |
| 2008/0097843 | A1 | 4/2008 | Menon |
| 2008/0255933 | A1* | 10/2008 | Leventhal et al. ............... 705/14 |
| 2009/0119167 | A1* | 5/2009 | Kendall et al. ................... 705/14 |
| 2009/0157486 | A1 | 6/2009 | Gross |
| 2009/0164323 | A1 | 6/2009 | Byrne |
| 2009/0216563 | A1 | 8/2009 | Sandoval et al. |
| 2009/0271289 | A1* | 10/2009 | Klinger et al. .................. 705/26 |
| 2010/0125490 | A1* | 5/2010 | Kiciman et al. ............. 705/14.1 |
| 2010/0131385 | A1* | 5/2010 | Harrang et al. ................. 705/26 |
| 2010/0217670 | A1* | 8/2010 | Reis et al. ................... 705/14.53 |
| 2010/0250330 | A1* | 9/2010 | Lam et al. ........................ 705/10 |
| 2010/0274815 | A1* | 10/2010 | Vanasco ....................... 707/798 |
| 2010/0280902 | A1* | 11/2010 | Pang ......................... 705/14.54 |
| 2010/0332330 | A1* | 12/2010 | Goel et al. ................. 705/14.66 |
| 2011/0231287 | A1* | 9/2011 | Bell ............................. 705/27.1 |

FOREIGN PATENT DOCUMENTS

WO WO-2011085152 A1 7/2011

OTHER PUBLICATIONS

DiVito, Timothy. "OpenID: A Potential Authentication Technology." Decision Line (2008): 7.*
"International Application Serial No. PCT/US2011/20449, Search Report mailed Mar. 10, 2011", 3 pgs.

(Continued)

*Primary Examiner* — Matthew Zimmerman
(74) *Attorney, Agent, or Firm* — Schwegman Lundberg & Woessner, P.A.

(57) ABSTRACT

A method and a system to manage recommendations in an online marketplace are presented. A social shopping interface is provided at a publisher site accessed by a first user identified by a first user identifier. A recommendation of a listing describing an item for sale and including a second user identifier corresponding to a second user is accessed from a recommendation database. The recommendation, including at least a portion of the listing and the second user identifier are displayed to the first user at the publisher site via the social shopping interface.

20 Claims, 10 Drawing Sheets

(56) References Cited

OTHER PUBLICATIONS

"International Application Serial No. PCT/US2011/20449, Written Opinion mailed Mar. 10, 2011", 5 pgs.

* cited by examiner

| BY USER | TO USER(S) | DESCRIPTION | ITEM ID | DATE RECOMMENDED | E-COMMERCE SITE | CONDITION | TIME LEFT | SELLER | SHIPPING |
|---|---|---|---|---|---|---|---|---|---|
| MARY | JAMES | CELL PHONE | 9845 | 4/3/2010 | EBAY™ | NEW | 2d 3h | WANDA | WORLDWIDE |
| SANDRA | ROBERTA | FLAT SCREEN TV | 8725 | 3/27/2010 | EBAY™ | REFURBISHED | 8d 15h | STELLA | NORTH AMERICA |
| JACK | BOB/SAM | LUGGAGE | 7685 | 2/12/2010 | EBAY™ | USED | 1d 3h | ANDREA | WORLDWIDE |
| JULIE | KERY | BOOK | 9287 | 8/27/2010 | GOOGLE CHECKOUT™ | NEW | NA | SAMANTHA | USA |
| MARTIE | SUSAN | PC NOTEBOOK | 34892 | 9/27/2010 | GOOGLE CHECKOUT™ | REFURBISHED | NA | LEONARDO | WORLDWIDE |
| LOUISE | JOSH | WATCH | 64-82-9934 | 3/24/2010 | AMAZON™ | NEW | NA | DREW | NORTH AMERICA |
| SAM | LARRY | DIGITAL CAMERA | 535-32-872 | 2/8/2010 | WALMART™ | NEW | NA | CLARK | WORLDWIDE |
| JONNY | JOHN | BINOCULARS | 27-64-92 | 5/5/2010 | EBAY™/AMAZON™ | NEW | NA | PERCY | USA |
| JEZABELL | ROGER | TELESCOPE | L1A-2789 | 6/27/2010 | BING™ | USED | NA | OLIVER | WORLDWIDE |
| MADISON | GREG | TENNIS RACQUET | 928762 | 4/28/2010 | BING™ | NEW | NA | LANGLEY | NORTH AMERICA |

FIG. 7

METHOD, MEDIUM, AND SYSTEM FOR MANAGING RECOMMENDATIONS IN AN ONLINE MARKETPLACE

This application claims the priority benefit of U.S. Provisional Application No. 61/293,899, filed Jan. 11, 2010 and titled "SOCIAL ORIENTED FINDING AND SHOPPING EXPERIENCE," which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010, eBay Inc. All Rights Reserved.

TECHNICAL FIELD

The present application relates generally to the technical field of data processing and, in one specific example, to managing recommendations in an online marketplace.

BACKGROUND

In the area of online commerce, a wide variety of products are available for purchase over the Internet to consumers. A consumer, via a search or a browsing session, may identify one or more items and purchase those items. In some instances, the consumer may identify an item for sale that may be of interest to a friend. In this case, the consumer may send a message to the friend that identifies the item. The friend may then independently navigate to the item and purchase the item.

BRIEF DESCRIPTION OF THE DRAWINGS

Some embodiments are illustrated by way of example and not limitation in the figures of the accompanying drawings in which:

FIG. 7 is an example table stored in a recommendation database, according to an example embodiment.

DETAILED DESCRIPTION

Example methods and systems for managing recommendations in an online marketplace are described. In the following description, for purposes of explanation, numerous specific details are set forth in order to provide a thorough understanding of example embodiments. It will be evident, however, to one skilled in the art that the present invention may be practiced without these specific details.

To purchase items in an online marketplace, online shoppers navigate to an e-commerce website and use a site-provided search application or other interface to browse for sale items for possible purchase. In some instances, widgets may be published at other websites that include short descriptions of items for sale within the online marketplace that are determined to be of interest to the user. While shopping online, a user may identify one or more items that may be of interest to a friend. To share the item with that friend, the user provides a recommendation identifying the item to the friend. A social shopping server allows the user to communicate one or more recommendations to one or more friends by communicating with the online marketplaces visited by the user and with the social networks to which the user belongs.

The social shopping server may further provide a social shopping widget at a website visited by the user. The widget may include descriptions of one or more items for sale, a listing of friends of the user in one or more social networks, a listing of recommendations sent by the user to one or more friends, and a listing of recommendations received by the user from one or more of the user's friends. In some instances, the user may be able to purchase an item from an online marketplace from within the widget itself without having to leave the visited website and directly navigate to the online marketplace website.

Figure 1:
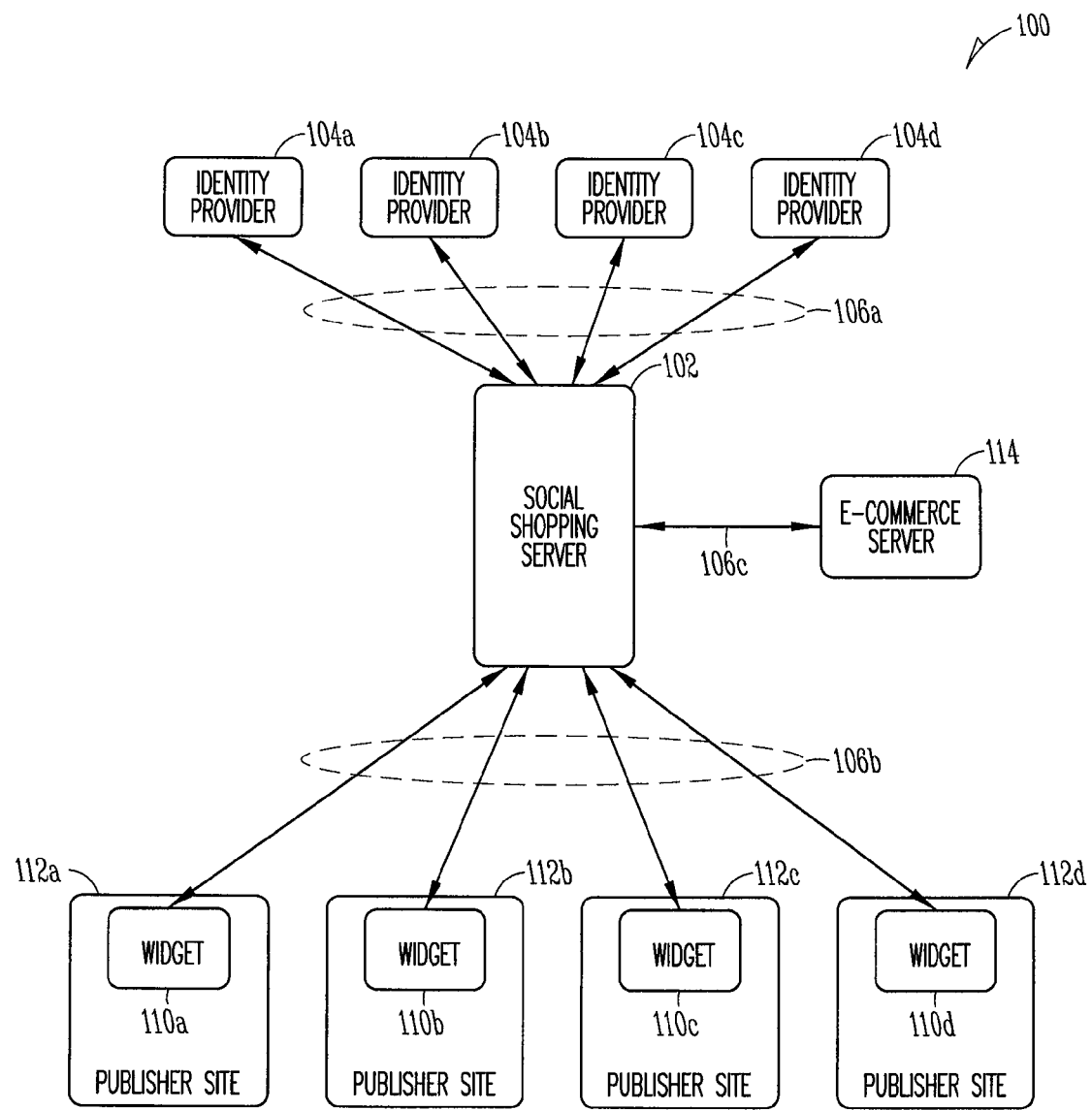
FIG. 1 is a block diagram illustrating a system architecture for online social shopping, according to an example embodiment.

An example embodiment of an online social shopping environment 100 is illustrated in the system architecture block diagram of FIG. 1. A social shopping server 102 (also referred to as a widget host) may be in communication with one or more identity providers 104*a-d* over a first connection 106*a*. An identity provider is an entity that authenticates a user via, for example, a username and password and provides authenticated login tokens to the social shopping server 102. As used herein, an identity provider further supports social networks where the user is associated with a plurality of other users known to the user, e.g., as friends or contacts. The identity providers 104*a-d* may be hosted by, for example, EBAY®, AOL®, YAHOO! ®, FACEBOOK®, or GOOGLE®. The user may initiate a login procedure to log in to an identity provider 104*a* using via a graphical interface provided within a social shopping widget 110*a* published by the publisher site 112*a*.

The social shopping server 102 may facilitate validation of security tokens received from the identity provider 104*a*, manage recommendations between users, facilitate purchases with an e-commerce server 114, and publish the social shopping widgets 110*a-d* at the publisher sites 112*a-d*. Once authenticated by an identity provider 104*a*, a user interacts with a widget 110a hosted by the social shopping server 102 from any one of several publisher sites 112a-d over a second connection 106b. The publisher site 112a may be a website hosting content such as blogs, special interest sites, marketplaces, or social networking sites. The social shopping widget 110a is an application that executes within a browser application upon navigation by the user to the publisher site 112a. The widget 110a provides a social shopping interface to the user. A social shopping interface, as used herein, is a graphical user interface for providing recommendations between users who are associated with one another via a social network.

In some embodiments, when a user visits a publisher site 112a including a widget 110a, the widget 110a may display the social shopping interface that includes a recommendation received from a friend. The recommendation is an identification of listing describing an item for sale and an identifier of the friend who submitted the recommendation for the user. The listing may be a generic description of a fungible product (e.g., automobile make and model) item for sale that is available for purchase from more than one seller or through more than one marketplace, a description of a fungible product offered by a specific seller or within a specific online marketplace (e.g., automobile make and number posted for sale on a specific auto-buying marketplace website), or a particular item sold by a particular seller (e.g., a collectible car sold by an auto collector). The item for sale may be a product, a service, a collectible item, or a fungible item. In some instances, the item for sale may refer to a particular listing of an item for sale. The listing may identify one or more e-commerce sites (such as an e-commerce site hosted by e-commerce server 114) where the item for sale may be purchased.

In some embodiments, the user may browse within an online marketplace and view an item for sale that the user desires to recommend to a friend via a social network hosted by identity provider 104a. To provide the recommendation, the user may log into the identity provider 104a (or the social shopping server 102 may validate a token issued by the identity provider 104a) via a widget 110a published by the online marketplace (in this example, the online marketplace is a publisher site 112a). Once authenticated, the user selects the listing describing the item for sale, an identifier of the friend, and, optionally, an identifier of the online marketplace. Additional information regarding the item for sale may be entered by the user or added by the social shopping server 102, such as a personalized message that may include an amount of time remaining to purchase the item, a most recent price bid on a sale item, a special on reduced shipping fees, or other promotional details of possible interest to the friend such as a promotional coupon or a gift certificate.

In some instances, while at a publisher site 112a that hosts the widget 110a, a user may purchase a sale item appearing in a recommendation. The recommendation shown to the user is recommendation previously received from a friend of the user where the friend identified the user. The recommendation shown to the user includes the identifier associated with the friend who submitted the recommendation to the social shopping server 102.

The e-commerce server 114 is connected to the social shopping server 102 via a third connection 106c. The e-commerce server 114 hosts at least one e-commerce website that posts descriptions of items for sale to a plurality of users. The e-commerce site is associated with one or more sellers and may be a classifieds site, an auction site, an online marketplace, a broker site, or a retail site. In some instances, the user may log in to the e-commerce site via, e.g., the widget 110a or the e-commerce server 114 may authenticate a token issued by the identity provider 104a. The e-commerce server 114 may access a record of the user that includes user information, payment information, purchasing history, or the like.

The widget 110a may provide an option to the user to purchase the recommended sale item. Upon receiving an indication from the user, the social shopping server 102 facilitates the purchase of the sale item from an e-commerce server 114 via the widget 110a. Alternatively, the social shopping server 102 may redirect the user to an e-commerce site hosted by the e-commerce server 114 by, for example, opening a new browser window or opening an e-commerce application. The social shopping server 102 may provide purchasing details through the third connection 106c to the e-commerce site. Purchasing details may include, for example, user information, payment information, information about applicable discounts or other specials, shipping information, or the recommendation itself.

Figure 2:
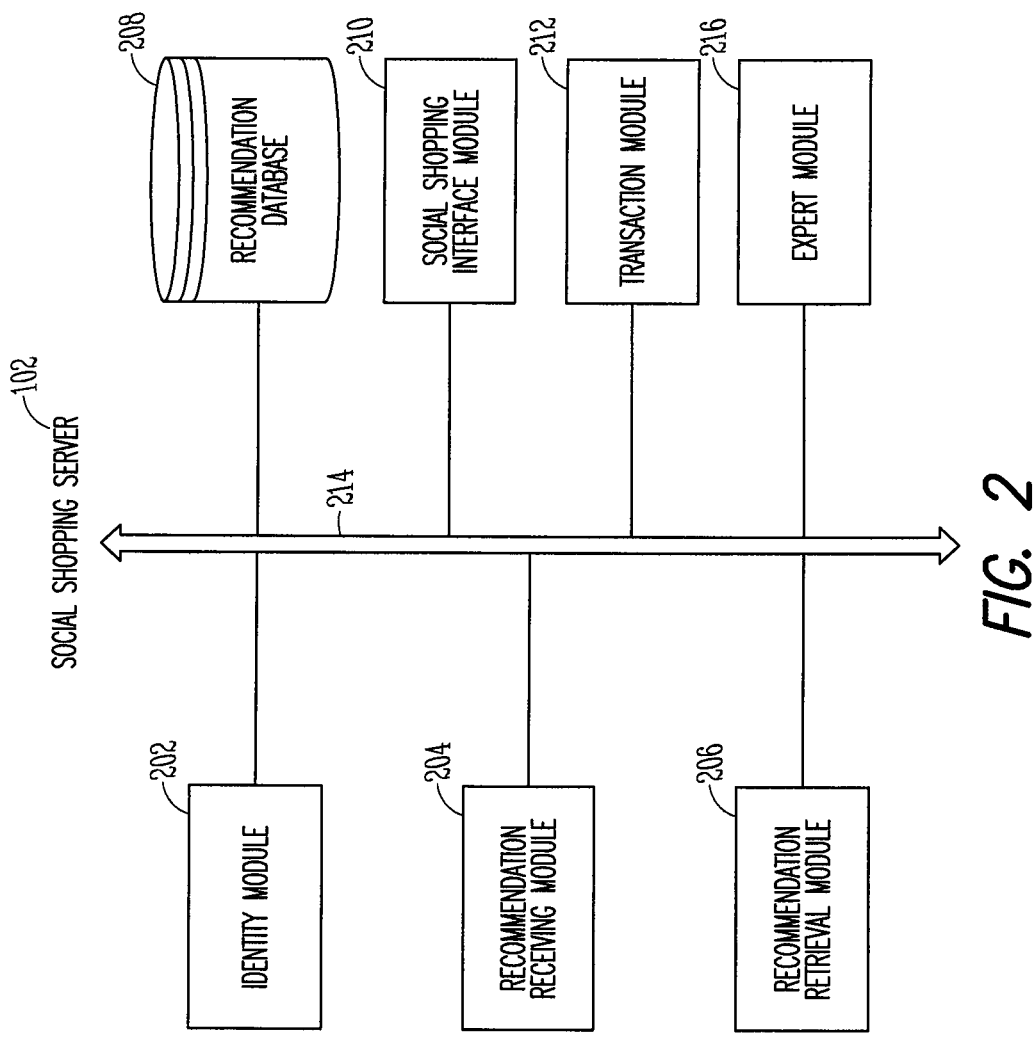
FIG. 2 is a block diagram of a widget host, according to an example embodiment.

An example embodiment of an online social shopping server 102 is illustrated in the block diagram of FIG. 2. The social shopping server 102 is depicted as including one or more hardware or software modules. The software modules include instructions embodied on a non-transitory computer-readable medium that are executable by a machine, a processor, or a computer. The social shopping server 102 (or widget host) includes an identity module 202, a recommendation receiving module 204, a recommendation retrieval module 206, a recommendation database 208, a social shopping interface module 210, and a transaction module 212 connected by a bus 214.

The identity module 202 is to authenticate a user. The identity module 202 validates a token issued by one or more identity providers 104. In some instances, the identity module may further validate a token issued by one or more e-commerce servers 114 where the user has a pre-existing account. In some embodiments, the social shopping server 102 may allow a user to log in to the social shopping server and perform an initial authentication of the user via a username and password.

The recommendation receiving module 204 may receive recommendations from a user and store the recommendations in a recommendation database 208. The recommendation receiving module 204 receives a selection of a listing and a selection of at least one friend. Based on the selections, the recommendation receiving module 204 assembles a record comprising a listing identifier, an identifier associated with the user, and one or more identifiers of the selected friends. The record may optionally include a description of the item, a date the item was recommended, an e-commerce site, a condition of the item for sale, a time remaining in an auction for the item, a seller of the item, shipping available for the item, discounts or special codes associated with the listing or recommendation, or the like.

The recommendation retrieval module 206 is to retrieve at least one stored recommendation from the recommendation database 208. In some instances, upon retrieving a recommendation, the recommendation retrieval module 206 may communicate with the e-commerce server 114 to generate a display of the recommendation that includes an image of the item for sale or an updated listing of the item for sale. The recommendation retrieval module 206, upon receiving an indication from the identity module 202 that a user is validated, accesses the recommendation database 208 and retrieves stored recommendations made by one or more friends to the validated user. In some instances, the recommendation retrieval module 206 may provide one or more filters selectable by the user to show or hide recommendations received by certain friends or for certain types of items. Other filters, such as by price, special discounts, or other characteristics, may be provided. In some instances, the recommendation retrieval module 206 may additionally retrieve recommendations made by the user to one or more friends and/or recommendations made by one of the user's friends to one or more other friends of the friend, but not to the user himself.

The recommendation database 208 is to store and manage recommendations made by the user and made to the user. For each recommendation, the recommendation database 208 may store a plurality of characteristics of the recommendation gathered by the recommendation receiving module 204, such as, a product identifier (identifying a fungible product sold by different sellers), a listing identifier (identifying a specific item for sale and/or a specific seller), an identifier of the user making the recommendation, an identifier of the user to whom the recommendation was made, a timestamp indicating when the recommendation was made, a description of the recommended item, an identifier of an e-commerce site where the item can be purchased, a condition of the item, a time remaining in a auction, a price of the item, a coupon code, a identifier of a discount or special promotion available to the user who submitted the recommendation or to the user who received the recommendation, a time remaining in an auction, an identifier of a seller of the item, shipping available for the item, the identity provider that authenticated the user, an expiration of the recommendation, an indication that the user receiving the recommendation ultimately purchased the item, a seller or e-commerce site the user ultimately purchased the item from, and other characteristics.

Figure 8A:
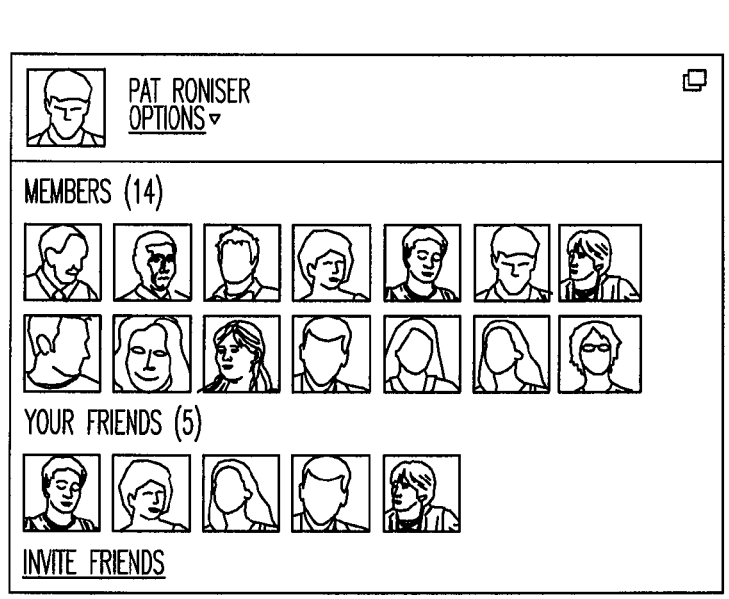
FIG. 8A depicts a first portion of an example user interface.
Figure 8B:
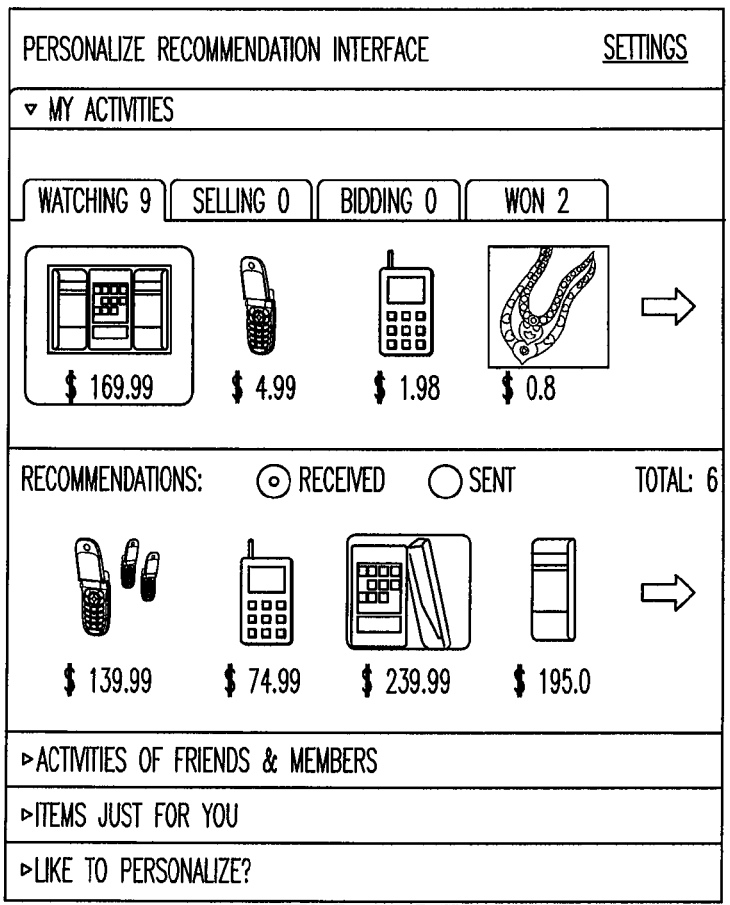
FIG. 8B depicts a second portion of an example user interface.
Figure 9:
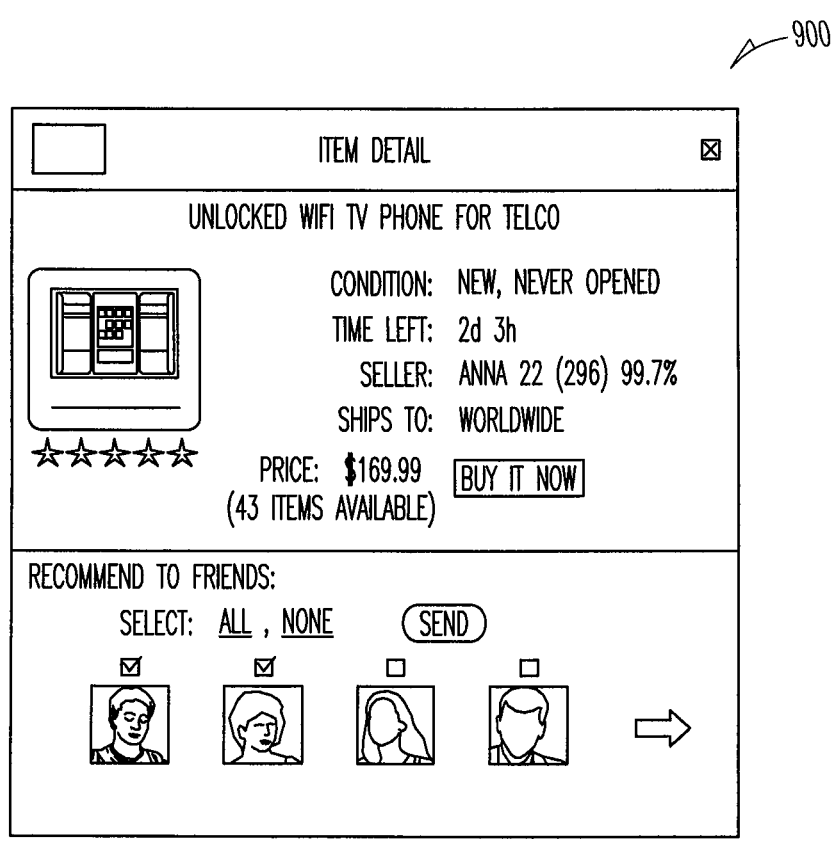
FIG. 9 depicts a third portion of an example user interface.

The social shopping interface module 210 provides one or more user interfaces to display the recommendations to the user via the widget 110*a* at the publisher site 112*a*. The social shopping interface module 210 may communicate with the identity module 202 to provide an interface to authenticate the user to the identity provider 104*a* or to the e-commerce server 114. The interface provided by the social shopping interface module 210 is to receive recommendations from the user and to display recommendations made to the user by friends of the user. The user interface may include a listing of the user's friends, a display of at least a portion of the recommendations received by the user from the user's friends, a display of at least a portion of the recommendations sent from the user, a display of at least a portion of the recommendations made by friends of the user to other friends of the user, a display of one or more listings of items for sale at one or more e-commerce sites, an interface to allow the user to purchase an item displayed in the interface (either as recommendation or as a listing of an item for sale). The interface may be customizable by the user. Example user interfaces are depicted in FIGS. 8A, 8B, and 9.

According to some embodiments, a user may purchase an item for sale in a recommendation by providing a purchase indication associated with the sale item in the social shopping interface produced by the social shopping interface module 210. Selection of the purchase indication by the user may be performed using the transaction module 212. The transaction module 212 establishes communication through the third connection 106*c* to the e-commerce server 114 that hosts an e-commerce site that sells the item for sale. In some instances, where the item for sale is a fungible product available from more than one seller (or e-commerce site), the transaction module 212 may identify the more than one seller and provide the user with a listing of the sellers. The user may then select a seller and proceed to purchase the item from the selected seller. The transaction module 212 may alternatively redirect the user to the e-commerce site. In some instances, the transaction module 212 may allow the user to login to an existing user account at the e-commerce site. The transaction module 212 may retrieve purchasing details used to complete the transaction.

Once communication with the e-commerce site is established, the transaction module 212 communicates the sale item listing information to the e-commerce server 114 to identify the item sought for purchase by the user. A product description, including selectable options such as quantity, size, and color, may be forwarded to the e-commerce site for determination of availability and final selection. Further details regarding the transaction, such as access to an e-commerce account associated with the user, shipping options, and method of payment, may be conducted through further communication between the transaction module 212 and the e-commerce site guided by user interaction provided through the social shopping interface module 210.

Through further communication between the e-commerce site and the transaction module 212, a user may maintain a watch on an item for sale or place a bid on an item for sale in the listing. The transaction module 212 in the e-commerce server 114 may facilitate all details necessary to enter bids in an auction and maintain a watch on an item for sale, including notification to the user when a quantity associated with the watched item, such as sale price, changes or a most recently entered the price.

In some embodiments, upon accessing a description of an item for sale from a recommendation, the user may discover the item for sale is a widely available or fungible item, freely interchangeable with similar items, and consequently receive several listings of the item for sale in the recommendation. Alternately, the user may choose an alternate item for sale based on a relationship to the first item for sale. For instance, the user may choose a different model, a different color, a different feature, or an accessory related to the first item for sale. Additionally, the user may browse additional listings based on characteristics of the item for sale in the recommendation. In a further example, upon reviewing the recommendation a user may determine that their needs and desires are not met by the particular item for sale and seek further recommendations from one or more further friends.

In yet a further embodiment, a social shopping widget 110*a* may provide additional interactive applications or applets to the user. These additional interactive applications may be triggered for presentation by the context of an item for sale in the recommendation listing. For example, if an item for sale includes tickets for a sporting event an additional application may be triggered to show seating arrangements at the arena where the sporting event will be held. Additionally, the application may provide connections to alternative marketplaces where additional tickets to the same sporting events are offered. Where multiple ticket offerings are available, those offerings and their associated seating arrangements may be offered within the same social shopping widget 110*a* display presentation by the additional application. The user may browse and select various ticket offerings and see the corresponding seating locations in the sports arena provided by the additional application. The possibility may exist for the additional application to provide a purchase of adjacent seats that are for sale from two different marketplaces.

According to one embodiment, the social shopping server 102 may additionally include an expert module 216 attached to the bus 214. In an online social shopping environment 100, members of the community may "follow" one another. When a first user follows a second user, the first user automatically receives recommendations made by the second user. A given user may be followed by multiple users, each receiving the recommendations made by the user. The expert module 216 tracks multiple users, each being followed by additional users. The expert module 216 also tracks the products being recommended by the followed user to identify one or more particular sales categories frequently recommended by the user. The expert module 216 may further monitor an outcome of the recommendations submitted by the followed user. An outcome of the recommendation may include purchases of the recommended item, whether the recommendation is forwarded to friends of the followers, or other activities. The users receiving the recommendations may rate the user making the recommendation. Those ratings, along with the number of recommendations that result in purchases (or other outcomes), may be used by the expert module 216 to produce an expert rating for the user making the recommendations.

For example, a first user chooses to follow a second user and as a result of following, receives a set of recommendations for a plurality of products from the second user. The first user rates each recommendation, where the expert module 216 registers the ratings and associates them with the first user and the second user's recommendations. As a result of the second user's recommendations, the first user may choose to purchase some or all of the items for sale in the listings within the recommendations. The expert module 216 keeps track of the number of the second user's recommendations that result in purchases.

An expert score may be determined by the expert module 216 based on various outcomes of the recommendations made by the second user. For example, the portion of the recommendations from the second user that result in purchases by other users (followers or friends of followers) may be used to calculate an expert score. In some instances, the ratings the followers give the recommendations may be used. Within the particular sales category, the second user may be identified using his respective expert rating and his subsequent recommendations may include an indication of that expert rating.

Figure 3:
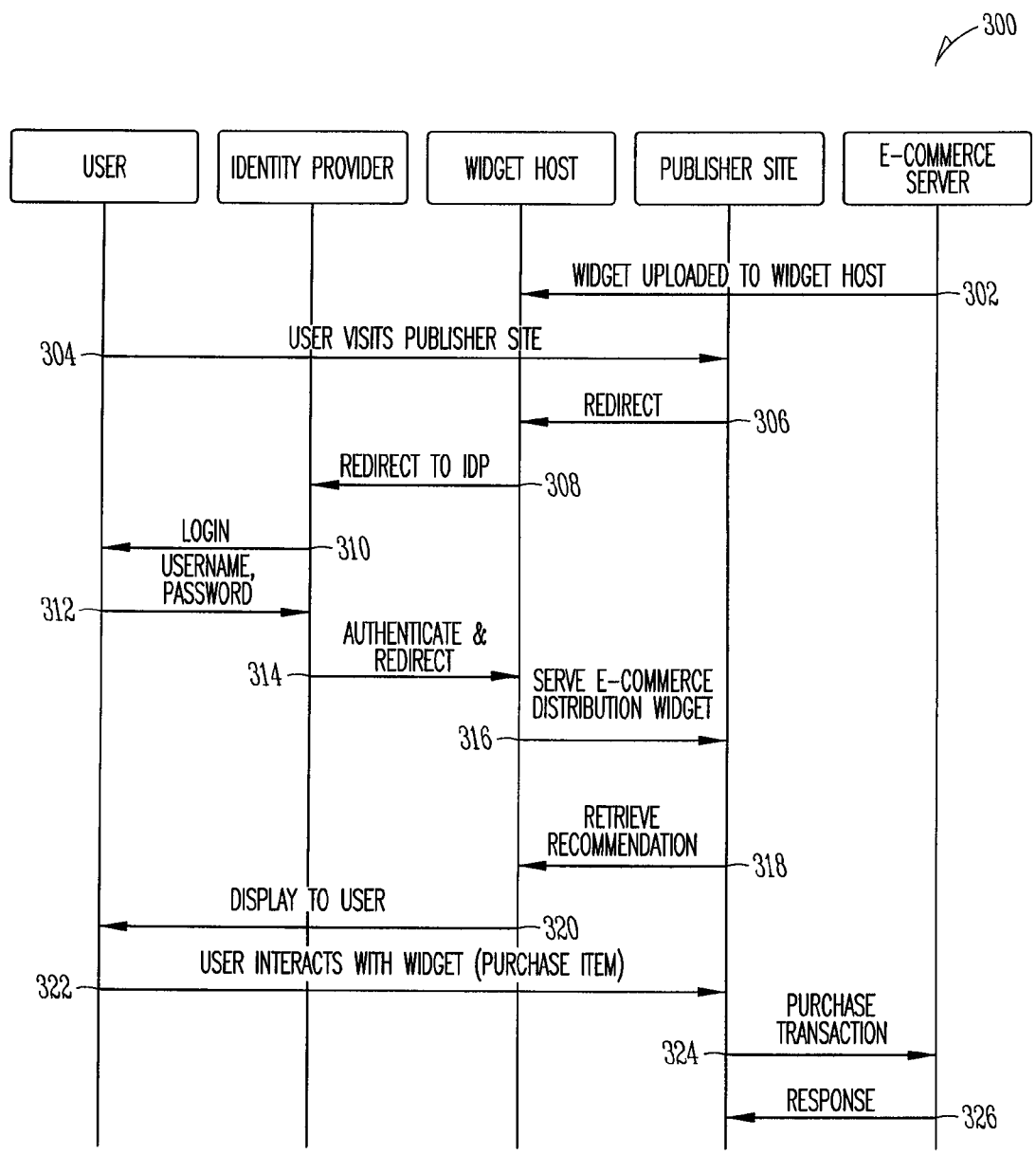
FIG. 3 is communications flowchart of an interaction between a user, an identity provider, a widget host, one or more publishers and an e-commerce server, according to an example embodiment.

An example embodiment of interactions between a user, an identity provider 104a, a social shopping server 102, a publisher site 112a, and an e-commerce server 114 are illustrated in FIG. 3. On a first occasion, a social shopping widget 110a is optionally uploaded 302 to a social shopping server 102 or widget host from, for example, an e-commerce server 114. The social shopping widget 110a may subsequently be provided to a publisher site 112a for inclusion in selected webpages and made available to users. The social shopping widget 110a may be customized based on at least one characteristic of the publisher site 112a, such as a site context, a publisher concept, or a predetermined characteristic of the user, for example. The publisher may enter into an agreement with the e-commerce site for compensation or other consideration regarding the use of the social shopping widget 110a at the publisher site 112a.

When a user visits 304 the publisher site 112a. The user may initiate a login to the social shopping environment 100 via the widget 110a and may be redirected 306 to the social shopping server 102. The identity module 202 within the social shopping server 102 may redirect 308 the login request to an identity provider 104a (IDP) associated with a social network to which the user (and the user's friends) belongs. The identity provider 104a may prompt 310 the user for login information. The user may provide 312 a username and password to the identity provider 104a. The identity provider 104a may validate the login request and generate an authenticated login token which may be redirected 314 to the identity module 202 at the social shopping server 102. Additionally, the user may login to an e-commerce server 114.

After receiving the authenticated login token, the social shopping server 102 may serve 316 a social shopping widget 110a to the publisher site 112a. The user may interact with the social shopping interface provided by the social shopping widget 110a to retrieve 318 the recommendation. The social shopping widget 110a may display 320 the recommendation to the user. The user may interact 322 with the social shopping widget 110a through the social shopping interface at the publisher site 112a to purchase an item for sale as listed in the recommendation.

The transaction module 212 in the widget host may communicate with the social shopping widget 110a to facilitate a transaction with the e-commerce server 114 to purchase 324 the item for sale. The e-commerce server 114 may respond with sale item information such as price, availability, and shipping options, for example.

Figure 4:
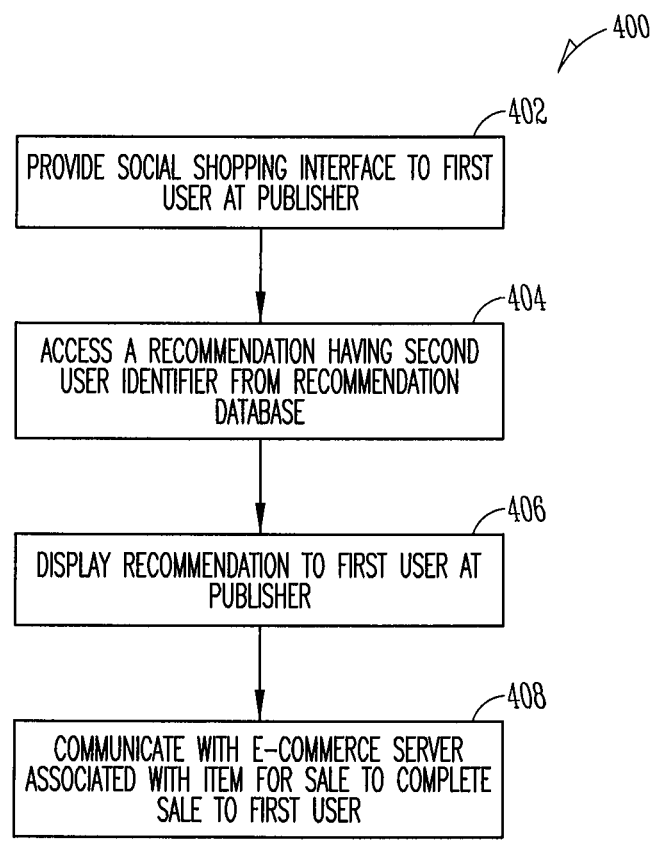
FIG. 4 is a flowchart of a process for providing a recommendation and shopping session to a user, according to an example embodiment.

FIG. 4 is a flowchart of a process 400 for providing a recommendation to a user. The process 400 may be performed by the social shopping server 102.

In an operation 402, widget (e.g., widget 110a) is provided to a first user at a publisher site 112a. The widget includes a social shopping interface.

In an operation 404, a recommendation having a second user identifier is accessed from the recommendation database 208. The operation 404 may include communicating with one or more e-commerce servers 114 to retrieve additional information about the recommended listings, such as an image, a price, available discounts, and the like.

In an operation 406, the widget displays the recommendation to the user at the publisher site (e.g., publisher site 112a).

In an optional operation 408, communication with the e-commerce server 114 associated with the item for sale is established to complete the sale to the first user.

Figure 5:
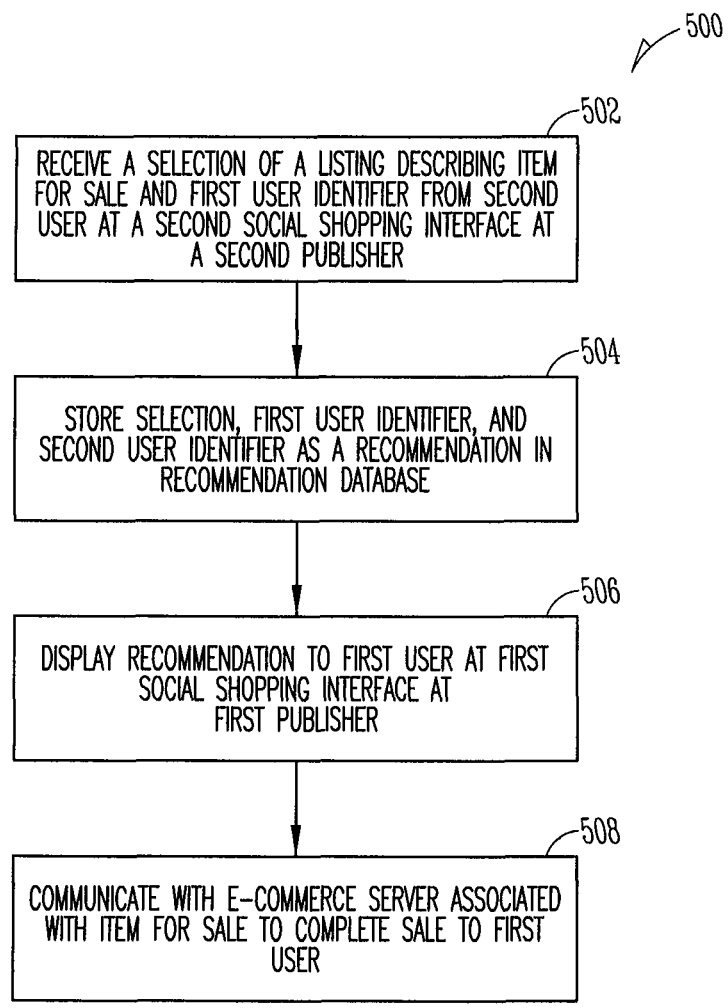
FIG. 5 is a flowchart illustrating a process for receiving a recommendation from a first user and providing the recommendation to a second user, according to an example embodiment.

FIG. 5 is a flowchart illustrating a process 500 for receiving a recommendation to a first user from a second user and subsequently providing the recommendation to the first user. The process 500 may be performed by the social shopping server 102 once the second user is authenticated by an identity provider.

In an operation 502, a selection of a listing describing an item for sale and a selection of an identifier of the first user is received from a second user at a second widget 110b at a second publisher site 112b. The selection may indicate that the item is a fungible item available from more than one seller, that the recommendation is limited to those items posted for sale by specific sellers, or if the item is only available from a particular seller.

In an operation 504, at least the selection, a first user identifier, and a second user identifier is stored as a recommendation in the recommendation database 208. The recommendation may later be accessed to display the recommendation to the first user via process 400 of FIG. 4.

Figure 6:
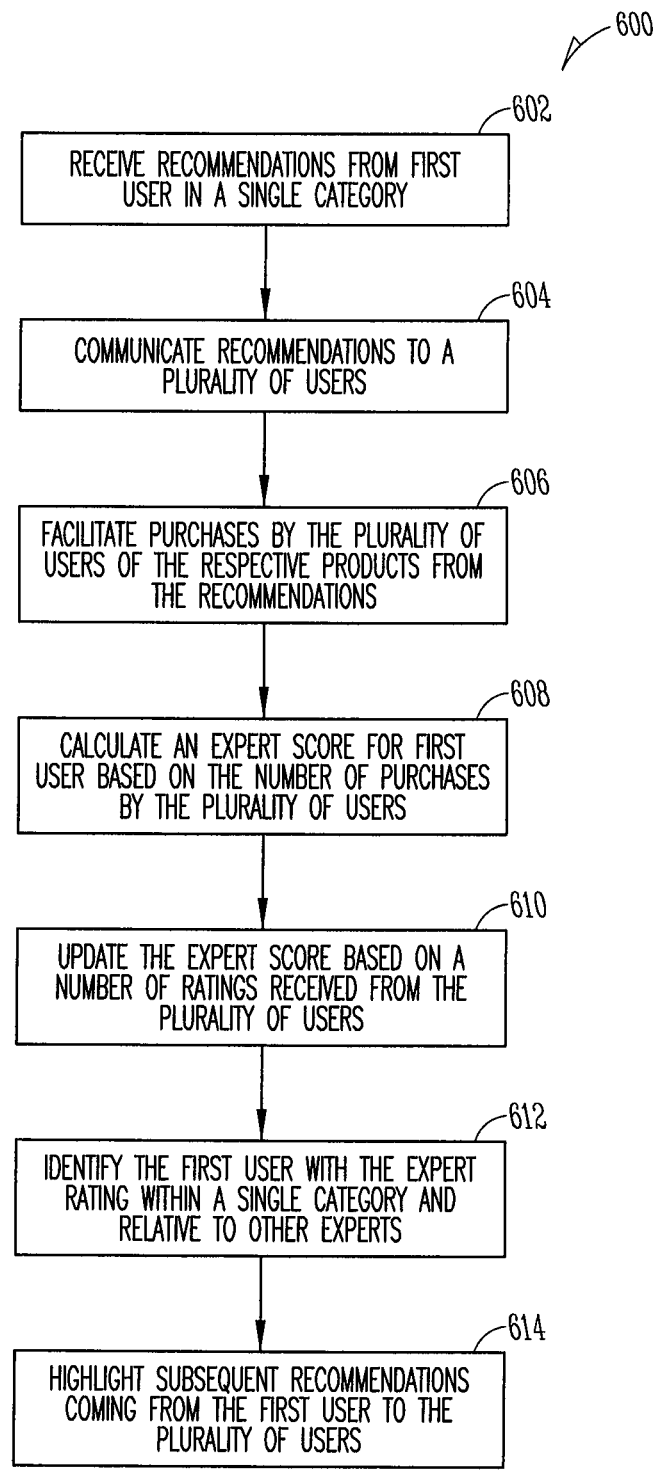
FIG. 6 is a flowchart illustrating a process for calculating an expert score for a first user whose recommendations are the basis for sales and ratings from other users, according to an example embodiment.

FIG. 6 is a flowchart illustrating a community expert process 600 for calculating an expert score for a first user whose recommendations are the basis for sales and ratings from other users. The community expert process 600 may be performed by the social shopping server 102 once each of the other users is authenticated by an identity provider.

Within the community expert process 600, recommendations for respective products within a single category are received 602 from a first user. The recommendations are communicated 604 to a plurality of users where the recommendations, the first user, and the plurality of users may be tracked by the expert module 216. The expert module 216 may be incorporated to track the recommendations where each of the plurality of users may be "following" the first user. Purchases of the respective products are facilitated 606 for the plurality of users and the purchases are based on the recommendations from the first user.

An expert score is calculated 608 for the first user based on the number of purchases by the plurality of users. The expert score is updated 610 for the first user based on a number of ratings received from the plurality of users. The first user is identified 612 with an expert rating within the single category and relative to other experts in the single category. Subsequent recommendations received from the first user are highlighted 614 as they are communicated to the plurality of users.

FIG. 7 is an example table 700 stored in a recommendation database 208 illustrating an example set of fields that may be associated with a recommendation. The table may include a description of the item for sale (Description), the user making the recommendation (By User), the user or users receiving the recommendation (To User[s]). The identifiers in the example table conform to typical first names. Alternatively, the identifiers may correspond with a nickname or a username corresponding to a logon ID or identifier from and associated social network. As shown the table 700 also includes fields containing an item identifier (Item ID) and a recommendation date (Date Recommended). The item identifier may be a unique name, number, or combination of letters and digits to uniquely identify an item for sale at an e-commerce site or across a plurality of e-commerce sites.

Further fields that may be stored in the table 700 include an e-commerce site identifier (E-commerce Site), condition (Condition, e.g., New, Used, or Refurbished), and remaining time in sale activity (Time Left). The table headings conclude with a seller identifier (Seller) and a shipping area identifier (Shipping). The data fields corresponding to the item for sale may be retrieved by the recommendation retrieval module 206 and provided to the social shopping interface module 210. The social shopping interface module 210 generates an interface that displays the recommendation to the user.

FIG. 8A depicts a first portion of a user interface including a personal contacts interface 800 according to one example embodiment. A user's identifier and thumbnail image are displayed in a header appearing in an upper proportion of the personal contacts interface 800. A main field of the personal contacts interface 800 displays an array and tally of thumbnails indicating other members and friends of the user in the social shopping environment 100. A button may be provided to invite more friends (INVITE FRIENDS) to the social shopping environment 100.

FIG. 8B depicts a second portion of a user interface including a personalized recommendation interface 850. According to the shown embodiment of the personalized recommendation interface 850, a first selector tab may include a "MY ACTIVITIES" pane that presents further tabs for displaying details regarding watched items (WATCHING), items being sold by the user (SELLING), items being bid on by the user (BIDDING), and items successfully bid on by the user (WON). By selecting the "WATCHING" tab, thumbnail images corresponding to a watched item for sale are displayed in an array along with a corresponding sale price. The transaction module 212 may be setup to communicate with the e-commerce server 114 with a periodicity according to selection of optional settings available in a further configuration pane upon selection of a settings button (SETTINGS). The user may register a corresponding set of user preferences for updates and other personalized recommendation interface environmental options in the configuration pane. Each of the additional tabs for selling, bidding, and monitoring of items containing similar button selections in displays which correspond with the respective tabs.

The personalized recommendation interface also includes a recommendations pane (RECOMMENDATIONS) displaying recommendations received from one or more friends or recommendations sent to one or more friends as may be selected with corresponding buttons selecting the received recommendations (RECEIVED) or the sent recommendations (SENT). A total number of recommendations maybe displayed next to a corresponding total field (TOTAL). A total amount of recommendations may be automatically tallied and displayed corresponding to selection of the received recommendations or the sent recommendations.

Further selection tabs may be selected to display similar activities corresponding to the friends and members displayed in the personal contacts interface described above. Activities corresponding to those presented above in the MY ACTIVITIES may be available for the respective friends and members displayed in the personal contacts interface 800.

FIG. 9 depicts a third portion of an example user interface depicting recommendation item details 900 (ITEM DETAIL). Quantities displayed in the recommendation item details 900 may correspond to recommendation fields in the recommendation database 208 as described in relation to the example table of FIG. 7. For example, quantities displayed may include the description of the item for sale, condition, time left to purchase, a seller identifier, shipping options, and sale price. A further pane for sharing the recommendation with friends (RECOMMEND TO FRIENDS) may include an array of thumbnail images of friends in the social shopping environment 100 along with check boxes and selection buttons to aid in identifying a select group of friends to whom the recommendation may be sent.

Figure 10:
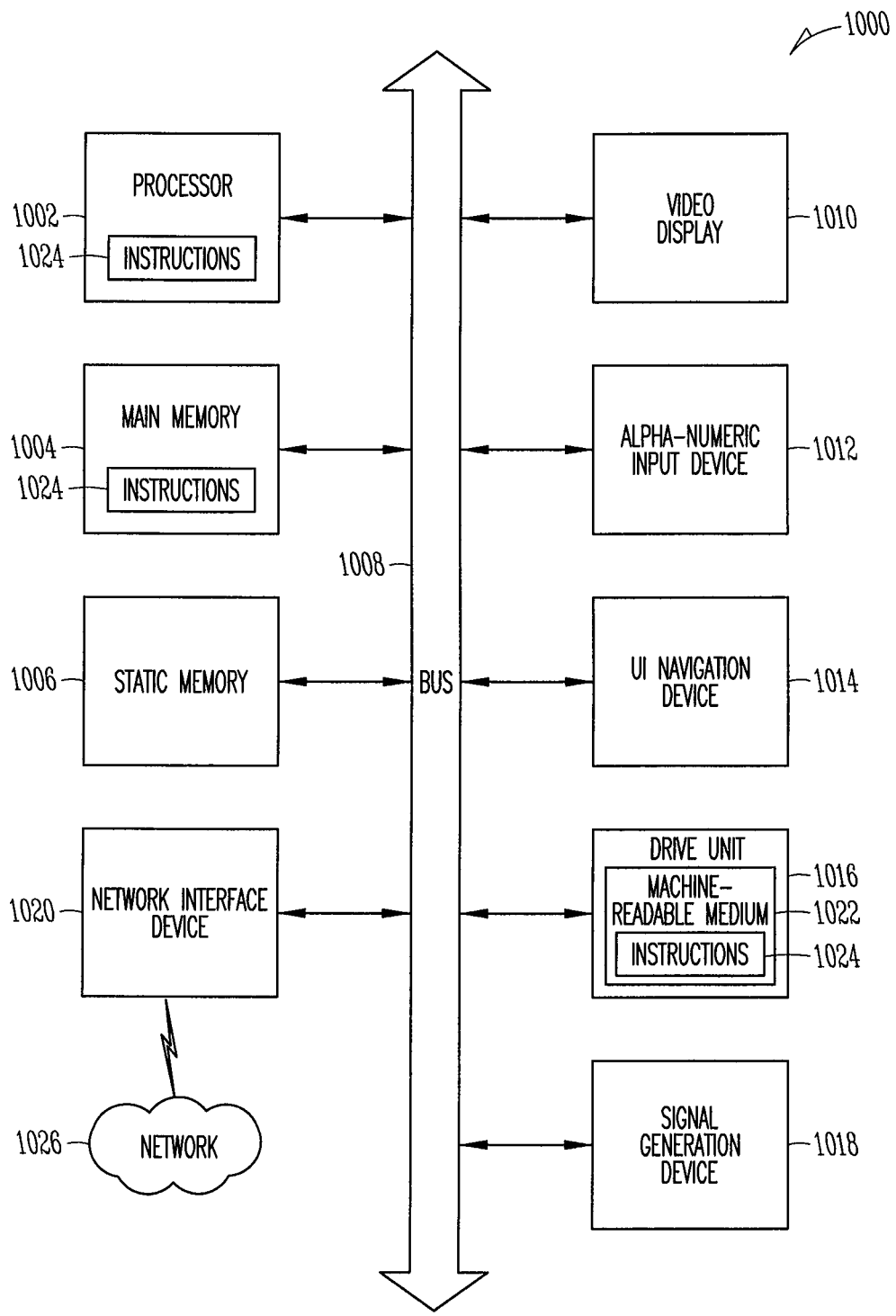
FIG. 10 is a block diagram of a machine in the form of an example computer system for executing instructions which process recommendations and facilitate shopping sessions.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020. In some instance, the computer system 1000 may include a touchscreen (not shown).

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, methods and systems to manage recommendations in an online marketplace have been described. The methods and systems described herein may provide technical solutions to technical problems including providing access through a widget and social shopping server to an e-commerce site for the purchase of an item where access is gained from a provider site without having to explicitly and directly navigate to an e-commerce site and login to conduct the transaction. A further technical solution provided herein is a capability to login to through the widget and social shopping server to any one of a number of identity provider sites, acquire an authenticated login token, and be admitted to one or more e-commerce sites to conduct authorized transactions. Yet another technical solution is an ability to gain access to an account corresponding to the user at any one of the e-commerce sites based on the authenticated login token provided by any one of a number of initial identity provider sites through a user's interaction with those sites by utilizing the widget and social shopping server.

An additional technical solution provided herein is the capability to distribute a recommendation of an item for sale, including a comprehensive description of the item including ancillary purchasing conditions and purchasing metadata, to one or more friends in a social shopping environment and social shopping network. And yet an additional technical solution provided herein is the capability to steer a greater number of users to an online marketplace from those online locations where shoppers spend most of their time in a manner that is more efficient than conventional advertising. This new efficiency is due to capitalizing on connections provided amongst the shoppers belonging to social networks they have in common and incorporating the widget and social shopping server within the shoppers typical shopping environments.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
generating, using at least one processor, a social shopping interface at a publisher site, the publisher site being accessed by a first user identified by a first user identifier;
in response to the access by the first user, retrieving, from a recommendation database, a recommendation of a listing describing an item for sale and including a second user identifier corresponding to a second user;
displaying at least a portion of the listing and the second user identifier to the first user at the publisher site via the social shopping interface;
receiving an authenticated login token subsequent to being authenticated by an identity provider site associated with a social network, the authenticated login token containing the first user identifier corresponding to the first user;
utilizing the authenticated login token, logging in to an e-commerce site hosted by the e-commerce server to establish a further connection;
utilizing the further connection, accessing an e-commerce account associated with the first user;
utilizing the further connection to the e-commerce site, retrieving an e-commerce site identifier to facilitate communicating with the e-commerce server; and
by utilizing the e-commerce site identifier, logging in to the e-commerce server to conduct the sale originating from the social shopping interface at the publisher site;
utilizing the authenticated login token to connect to the e-commerce server, conducting a sale of the item for sale to the first user with the social shopping interface at the publisher site; and
wherein the identity provider site and e-commerce site and publisher site are different.

2. The method of claim 1, further comprising:
receiving, from the second user, the recommendation including the first user identifier and a selection of the listing describing the item for sale; and
storing the recommendation in the recommendation database at a social shopping server.

3. The method of claim 2, wherein the recommendation further includes the e-commerce site identifier.

4. The method of claim 1, wherein the connection to the e-commerce server utilized in conducting the sale of the item for sale to the first user further comprises displaying the listing on the social shopping interface to enable the first user to watch, or place a bid on the item for sale in the listing.

5. The method of claim 1, further comprising displaying to the first user at least one of a received recommendation that the first user has received from the second user, a sent recommendation that the first user has sent to the second user, a purchased item list, a watched item list, and a list of items that the first user has bid on.

6. The method of claim 1, wherein the social shopping interface is customized based on at least one characteristic of the publisher site, the publisher site characteristic being a site context, a publisher concept, or a predetermined characteristic of the first user.

7. The method of claim 1, wherein:
the first user and the second user belong to the social network hosted by the identity provider site; and
the connection to the e-commerce server is established using a social shopping server.

8. The method of claim 1, wherein retrieving the recommendation comprises determining that the item for sale is a fungible item and identifying a plurality of listings describing the item for sale.

9. The method of claim 1, further comprising identifying an alternate item for sale based on a relationship to the item for sale, the relationship being a different model, a different color, a different feature, or an accessory.

10. The method of claim 1, further comprising:
receiving, from the first user, a third user identifier identifying a third user and
displaying the first recommendation to the third user.

11. The method of claim 1, wherein the recommendation further comprises a promotional coupon or a gift certificate.

12. The method of claim 1, further comprising browsing additional listings based on characteristics of the item for sale.

13. The method of claim 1, further comprising receiving a request from the first user for further recommendations from one or more friends of the first user.

14. A system comprising:
one or more processors and a memory configured to store a plurality of recommendations of listings of items for sale, the respective recommendations including a first user identifier and a second user identifier where the second user has submitted the recommendation and the first user is to receive the recommendation;
a receiving module configured to receive the plurality of recommendations from the second user;
a retrieval module configured to retrieve the recommendation to the first user from the memory and to provide the recommendation to a social shopping interface based on having received the first user identifier;
a social shopping interface module, configured to generate the social shopping interface at a publisher site, the social shopping interface being configured to display the recommendation to the first user; and
a transaction module configured to connect with an e-commerce server to facilitate a sale of an item for sale to the first user; and
an identity module configured to utilize an authenticated login token to connect to an e-commerce server and conduct a sale of the item for sale to the first user with the social shopping interface at the publisher site; and
one or more additional modules configured to:
receive the authenticated login token subsequent to being authenticated by an identity provider site associated with a social network, the authenticated login token containing the first user identifier corresponding to the first user;
by utilizing the authenticated login token, log in to an e-commerce site hosted by the e-commerce server to establish a further connection;
by utilizing the further connection, access an e-commerce account associated with the first user;
by utilizing the further connection to the e-commerce site, retrieve an e-commerce site identifier to facilitate communicating with the e-commerce server; and
by utilizing the e-commerce site identifier, log in to the e-commerce server to conduct the sale originating from the social shopping interface at the publisher site;
wherein the identity provider site and e-commerce site and publisher site are different.

15. The system of claim 14, further comprising an identity module to manage authenticated login tokens originating from an identity provider site.

16. A non-transitory computer-readable storage medium having instructions embodied thereon that when executed by a processor cause the processor to perform a method comprising:
generating, using at least one processor, a social shopping interface at a publisher site, the publisher site being accessed by a first user identified by a first user identifier;
in response to the access by the first user, retrieving, from a recommendation database, a recommendation of a listing describing an item for sale and including a second user identifier corresponding to a second user;
displaying at least a portion of the listing and the second user identifier to the first user at the publisher site via the social shopping interface;
receiving an authenticated login token subsequent to being authenticated by an identity provider site associated with a social network, the authenticated login token containing the first user identifier corresponding to the first user;
utilizing the authenticated login token, logging in to an e-commerce site hosted by the e-commerce server to establish a further connection;
utilizing the further connection, accessing an e-commerce account associated with the first user;
utilizing the further connection to the e-commerce site, retrieving an e-commerce site identifier to facilitate communicating with the e-commerce server; and
by utilizing the e-commerce site identifier, logging in to the e-commerce server to conduct the sale originating from the social shopping interface at the publisher site;
utilizing the authenticated login token to connect to the e-commerce server, conducting a sale of the item for sale to the first user with the social shopping interface at the publisher site; and
wherein the identity provider site and e-commerce site and publisher site are different.

17. The storage medium of claim 16, wherein the method further comprises:
receiving, from the second user, the recommendation including the first user identifier and a selection of the listing describing the item for sale; and
storing the recommendation in the recommendation database at a social shopping server.

18. The storage medium of claim 16, wherein the connection to the e-commerce server utilized in conducting the sale of the item for sale to the first user further comprises displaying the listing on the social shopping interface to enable the first user to watch, or place a bid on the item for sale in the listing.

19. The storage medium of claim 16, wherein the method further comprises:
receiving, from the first user, recommendations for respective products within a single category;
communicating the recommendations to a plurality of users;
facilitating purchases of the respective products with a plurality of users, the purchases based on the recommendations from the first user;

calculating an expert score of the first user based on the number of purchases by the plurality of users;

identifying the first user with an expert rating based on the expert score within the single category and relative to other experts in the single category; and highlighting subsequent recommendations received from the first user.

20. The storage medium of claim 19, wherein the method further comprises:

receiving, from a plurality of other users, ratings corresponding to the recommendations made by the first user;

updating the expert score of the first user based on the ratings from the plurality of other users and the number of recommendations received from the first user; and identifying the first user with the updated expert rating within the single category relative to the other experts in the single category, the updated expert rating corresponding to the updated expert score.

* * * * *

UNITED STATES PATENT AND TRADEMARK OFFICE
CERTIFICATE OF CORRECTION

PATENT NO. : 8,671,029 B2  Page 1 of 1
APPLICATION NO. : 12/949352
DATED : March 11, 2014
INVENTOR(S) : Kassaei et al.

It is certified that error appears in the above-identified patent and that said Letters Patent is hereby corrected as shown below:

In the Claims

In column 13, line 20, in Claim 10, delete "user and" and insert --user; and--, therefor In column 13, line 46, in Claim 14, after "user;", delete "and", therefor Signed and Sealed this
Second Day of December, 2014

Michelle K. Lee
*Deputy Director of the United States Patent and Trademark Office*